UNITED STATES PATENT OFFICE.

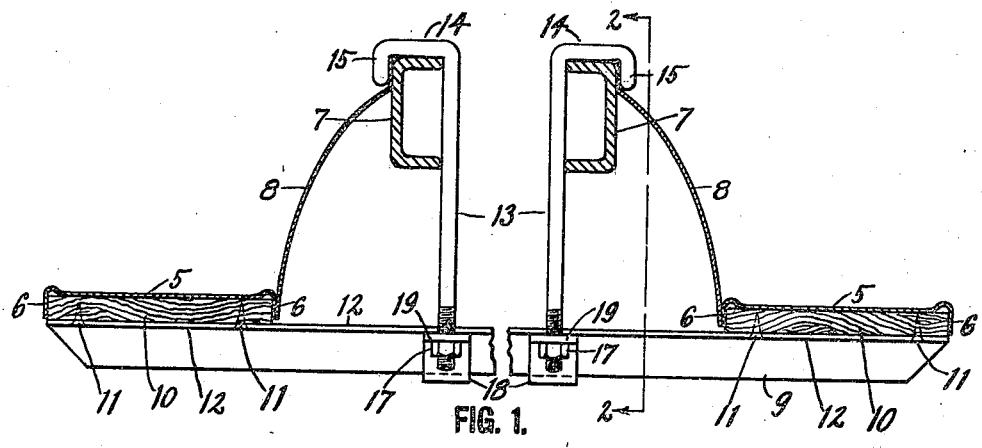

WILLIAM HAGGLUND, OF DASSEL, MINNESOTA.

BRACE FOR AUTOMOBILE RUNNING BOARDS.

1,426,564.  Specification of Letters Patent.  Patented Aug. 22, 1922.

Application filed April 30, 1921. Serial No. 465,650.

*To all whom it may concern:*

Be it known that I, WILLIAM HAGGLUND, a citizen of the United States, residing at Dassel, in the county of Meeker and State of Minnesota, have invented a new and useful Brace for Automobile Running-Boards, of which the following is a specification.

My invention relates to braces for automobile running boards and the main object is to provide a device of simple and rigid construction which can be hung on the main frame and placed in supporting position relative to the running board of an automobile without the use of special tools and without drilling holes or altering the frame or other affected parts of the automobile in any way.

In the accompanying drawing:

Fig. 1 is an elevation of my device applied to the frame channels and running boards of an automobile, the later parts being shown in transverse section.

Fig. 2 is a sectional elevation as on line 2—2 of Fig. 1.

Fig. 3 is a detail front view of one of the hangers of my device in modified form shown as applied to the automobile chassis.

Fig. 4 is a right hand side view of the hanger in Fig. 3.

Referring to the drawing by reference numerals, 5 are the opposite running boards or foot boards of an automobile having downwardly turned flanges 6. 7 is the main frame members usually channel shaped and with their web side out as shown, 8 the mud guards which extend the full length of the runing boards and slope from the main frame channels down to the running boards.

The preferred form of my device consists of a transversely arranged main supporting bar 9 which is T-shaped in cross section and of a length to correspond with the distance between the outside flanges 6. 10 are two blocks of wood each of a length to fit snugly between the flanges 6 of the running board 5, and are secured to opposite ends of bar 9 by screws 11 which pass through the flanges 12 of said bar. The T-bar is suspended from the main frame channels 7 by hanger bars 13 which have their upper ends hook-shaped as at 14 to straddle the upper flanges of said channels. Said bars or hangers 13 may each be made of one piece of round bar iron bent together at $14^a$ (see Figs. 1 and 2) and forming a hook 15 then gradually separated as at $15^x$ (Fig. 2) and the two ends extend downwardly and parallel, their extremities threaded as at 16 for nuts 17 engaging a U-shaped metal yoke 18 having oppositely extending perforated arms 19, which receive the threaded ends 16 of the hanger. The U-shaped portion of the yoke 18 receives loosely the vertical leg of the bar 9 and the flanges 12 of bar 9 rest on arms 19 of the yoke 18.

The hangers may also be made as shown in Figs. 3 and 4, in which hanger bar $13^x$ is a piece of flat bar bent to form a yoke $14^x$ straddling the top flange of frame channel 7, its lower end $13^{xx}$ bent out horizontally and then doubled over at 20 and the end 21 brought back toward the channel for strength. An unthreaded hole 22 is drilled through arms $13^{xx}$ and 21 to receive the threaded end 23 of a stem 24 forming the upper end of a yoke 25 which has at its lower end a U-shaped loop $18^x$ and shoulders 26 for receiving the T-bar 9 in its normal position. A nut 27 on the threaded end 23 permits bar 9 to be raised or lowered to its right position.

In the use of the device the bar 9 is simply placed crosswise under the automobile and brought upward until blocks 10 are between flanges 6 of the running boards 5 on both sides. Then the hanger bars are hooked over frame channels 7, their lower ends engaged by the arms 19 of yokes 18 and the nuts 17 screwed up until the device is tightly secured in place. When using the modified form in Figs. 3 and 4 the yokes 25 are merely slipped over bar 9 before the latter is put in place, hangers $13^x$ are then hooked over channels 7, the threaded end 23 of each yoke 25 merely slipped through hole 22 in each hanger and nut 27 screwed down until bar 9 is sufficiently secure in its place to support the running boards.

With bar 9 of heavy T-iron and other parts relatively strong it will be readily seen that the running board is practically unbreakable and therefore highly useful to farmers or others who transport heavy goods and even live stock in crates or otherwise on the running board. It will be further understood that the maximum strength in the supporting T-bar is available as no large holes are drilled through it for the hangers.

What I claim is:

The combination with the frame and the running board of an automobile, of a bar extending horizontally across the automobile and having upon its ends blocks supporting the running boards, said bar being T-shaped in cross section and arranged with its middle rib downward, two hangers supporting each one end of said bar, each of said hangers having its upper end formed with a hook engaging over some bar of the frame and being below the hook bifurcated into two threaded legs depending one at each side of the T-bar, a clip crossing the under side of the T-bar and having a deep notch fitting the downward rib of same said clip having near each end a hole for the depending legs of the hanger, and nuts threaded on the legs below the clip to support it.

In testimony whereof I affix my signature.

WILLIAM HAGGLUND.